OPTICAL MEMORY SYSTEM

Filed Aug. 9, 1965

INVENTORS K. D. BOWERS
J. A. MORTON
BY Herbert M. Shapiro
ATTORNEY

3,421,154
OPTICAL MEMORY SYSTEM

Klaus D. Bowers, Summit, and Jack A. Morton, South Branch, N.J., assignors to Bell Telephone Laboratories Incorporated, New York, N.Y., a corporation of New York Filed Aug. 9, 1965, Ser. No. 478,153
U.S. Cl. 340—174 10 Claims
Int. Cl. G11b 5/00

This invention relates to optical memory systems and, more particularly, to electrically-changeable storage units therefor.

Optical memory systems promise to be quite inexpensive on a cost-per-bit basis as is well known. Accordingly, such systems appear commercially competitive particularly for high capacity memories and attempts are now being made to implement them. There are, however, certain impediments to the implementation of such systems. One such impediment is the lack of a simple electrically changeable storage unit which can be accessed optically, for example, by well known digital light deflectors; and, accordingly, a prime object of this invention is to provide one such electrically changeable storage unit.

The approach to such storage units in the past has been to utilize light responsive characteristics of storage materials for the storage and retrieval of information. In one such memory, for example, described in United States Patent 3,164,816 of J. T. H. Chang, J. F. Dillon, Jr., and U. F. Gianola, issued Jan. 5, 1965, optically generated heat raises a ferrimagnetic material from its compensation temperature at a localized area therein, and a coincidentally generated magnetic field selectively stores information at that area. Flux orientations in the material are determined by the effect thereof on the plane of polarization of reflected or transmitted light. In other memories, information is stored as the presence and absence of spots developed in photographic films. In accordance with these prior art approaches, the necessity for large numbers of lead connections and the problems caused thereby are avoided. Specifically, cumulative inductive loading and mere physical size of large numbers of lead connections are disabling problems as far as cycle time, size, and fabrication expenses are involved. Unfortunately, the problems are avoided at the expense of relatively high power requirements and relatively slow operation in the first instance and the relative permanence of information in the other.

This invention is based on the realization that well tested current responsive flux switching techniques may be turned to account for the storage of information in storage units for optical memories by controlling the currents and the current paths therefor optically. The problems due to multiple lead connections also are avoided herein.

The foregoing and further objects of this invention are realized in one embodiment thereof wherein an array of conductor loops are arranged between a source of relatively high potential and a source of relatively low potential (ground) on the surface of a magnetic material. The conductor loops are open circuited at two points and first and second photoconductive spots bridge the open circuits. In response to light directed at the first spot, current flows around one portion of the conductive loop driving flux to one stable condition in the magnetic material encompassed by the loop. In response to light directed at the second spot, current flows in the other portion of the loop driving flux to a second stable condition. The direction of flux is detected optically, for example, by the Faraday effect. The storage unit requires but two leads, one connected to a potential source, the other to ground.

Accordingly, a feature of this invention is a storage unit comprising a plurality of current loops, each having first and second open circuit sections therein, connected between a potential source and ground, wherein said open circuits are selectively closed optically for the storage of first and second stable states in magnetic material associated with the loop.

The foregoing and further objects and features of this invention will be understood more fully from a consideration of the following detailed description rendered in conjunction with the accompanying drawing, wherein.

Figure 1:
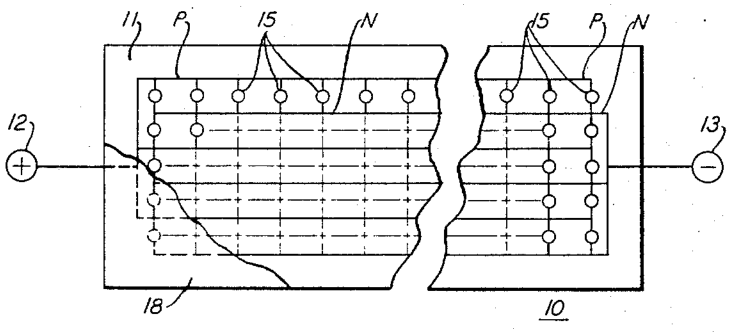
FIG. 1 is a schematic illustration of a storage unit in accordance with this invention.
Figure 2A:
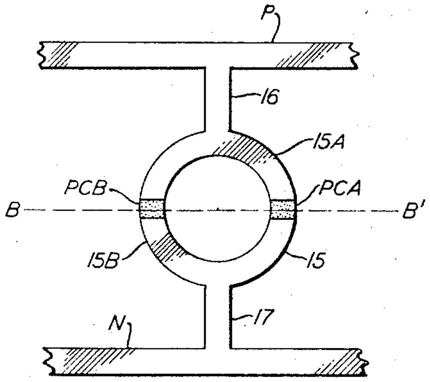
FIGS. 2A and 2B are top and exploded views of portions of the storage unit of FIG. 1.
Figure 2B:
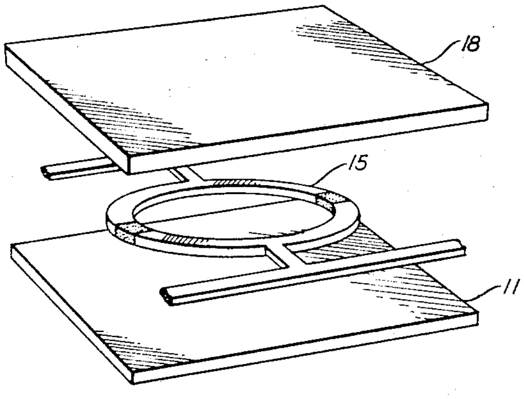

FIG. 1 illustrates an electrically-changeable storage unit 10 in accordance with this invention. The storage unit comprises a magnetically retentive material 11 on the surface of which first and second spaced apart "comb-like" conductors are positioned with the "teeth" thereof interleaved. Interleaved structures of this type are commonly characterized as "interdigital" structures. The first conductor is connected to a source 12 of positive potential and, so, is designated P. Similarly, the second conductor is connected to a source of relatively negative potential 13 and, so, is designated N. Conveniently, sources 12 and 13 comprise a single battery to opposite sides of which conductors P and N are connected. A plurality of conductive loops 15 are connected between corresponding teeth of the comb-like conductors P and N. The resulting arrangement for a representative loop is shown enlarged in FIG. 2A. The loop 15 is seen connected to conductors P and N by conductive tabs 16 and 17, respectively. The conductive loop may be thought of as composed of two portions 15A and 15B each of which includes a normally insulating photoconductive material PCA and PCB, respectively. A film 18 also of magnetically retentive material, shown cut away in FIG. 1, overlies the conductive structure. An exploded view of the representative conductive loop and the retentive materials (18 and 11), respectively, thereabout are shown in FIG. 2B.

The operation of the storage unit of FIG. 1 is most easily understood in terms of the storage and detection of binary values in a portion of the retentive magnetic material coupled to a single conductor loop. One such loop with the encompassing retentive material is shown in cross section in FIGS. 3A and 3B. The cross section is taken along line B–B′ of FIG. 2A as viewed from the N conductor shown there.

Figure 3A:
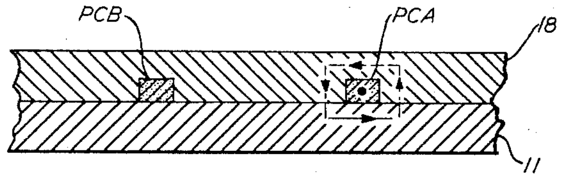
FIGS. 3A and 3B are cross-section views of the portion of the storage unit, in accordance with this invention, as shown in FIG. 2A.

Light, for example, from a digital light deflector as described in copending application Serial No. 420,976, filed December 24, 1964, for J. T. Sibilia and W. J. Tabor, now abandoned, striking photoconductive material PCA causes current to flow from the corresponding P conductor to the N conductor through material PCA. To this end, the normally insulating photoconductive material PCA and PCB in conductive loop 15 provides two essentially short circuits which are selectively closed (made conductive) in response to light incident thereto. Light striking material PCA, initiating current flow as described, consequently, generates a field about conductor 15A which field drives flux downward in the encompassed magnetic material. The resulting flux pattern is shown in FIG. 3A by the downward directed arrow in retentive material 11 encompassed by loop 15 there. Flux finds closure through film 18 about portion 15A of loop 15. Since film 18 need only provide flux closure, the material thereof need not be retentive; alternatively, the film may comprise material of relatively low reluctance.

Figure 3B:
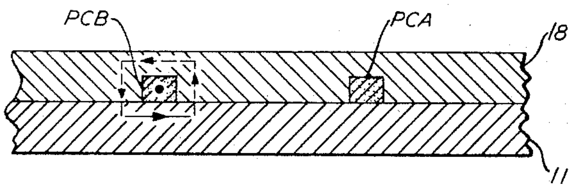

Flux in the downward direction in the retentive magnetic material encompassed within loop 15 is arbitrarily taken to represent a stored binary one. A binary zero is stored as flux directed upward in that portion of the retentive material. Specifically, light striking photoconductor PCB closes the open circuit in portion 15B of loop 15 permitting current to flow from conductor P to conductor N therethrough for generating a field thereabout to set flux upward in the designated area. The flux pattern for a stored zero is shown in FIG. 3B. Thus, binary ones and zeros are stored in portions of a magnetically retentive material in response to the selective closing of first and second short circuits in a conductive loop.

Reading is accomplished as described in the aforementioned patent by, most conveniently, measuring the rotation of the plane of polarization of light transmitted through (Faraday effect) or reflected from (Kerr effect) that portion of the retentive material encompassed by each loop. Specifically, polarized light, for example, transmitted through the retentive material, has the plane of polarization thereof rotated in one direction for one orientation of flux within the interrogated area of the material and in the other direction for the other orientation.

Since storage and retrieval of information may be confined to a portion of the retentive material encompassed by the conductive loop, that portion of the retentive material may be considered a bit location of the storage unit. Accessing digital light deflectors compatible with such a storage unit need provide three positions of light for each bit location.

It may be appreciated that the conductive loop need not be circular in shape. In fact, the loop may comprise two straight portions each connected to conductors P and N by separate tabs. It may be further appreciated that the photoconductive material may be replaced by, for example, avalanching diodes. Operation is entirely analogous.

Figure 4:
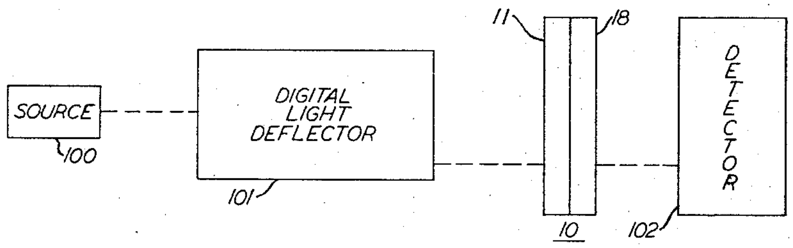
FIG. 4 is a block diagram of an optical memory compatible with the storage unit of FIG. 1.

It is convenient at this juncture to describe the over-all system in which such a storage unit is operated. Because such systems are well known, the description is abbreviated. Specifically, an optical memory in which a storage unit in accordance with this invention is operable is shown in block diagram form in FIG. 4. The figure shows a source 100 of polarized light directing light into a digital light deflector 101. As is well known, such light deflectors route input light to one of a plurality of output positions in response to coded inputs to polarization modulators (switches) in the various stages thereof. Both the stage structure and the input means are well known and, accordingly, are omitted from the description here. Suffice it to say that light emerges from such a deflector to impinge on selected bit locations of the storage unit. A transmission mode of operating the optical memory is illustrated in FIG. 4. That is to say, the rotation of the plane of polarization of light transmitted through the bit location is detected by a detector 102 in the transmission path therebeyond. For this purpose, detector 102 typically includes a polarizer set to extinguish light polarized in one of the directions to which light is rotated by the retentive material. Note: for a transmission mode of operation, both retentive materials of the storage unit are transparent at the frequency of the light used. Suitable materials are suggested hereinafter.

Alternatively, a reflection mode of operation (not illustrated) may be used as described in the aforementioned copending application of Sibilia and Tabor. Since a digital light deflector passes light only when the plane of polarization thereof is in a "preferred" direction, the plane of polarization of light reflected back into the deflector in a reflection mode of operation must have at least a component in that preferred direction in order to be detected. A suitable orientation for reflected light is provided by a rotator positioned between the deflector and the storage unit. Light rotated in one direction by the storage unit is further rotated by the rotator, for example, to 90 degrees from the preferred direction. (Light rotated in this direction is extinguished.) Light rotated in the other direction by the storage unit is further rotated to some intermediate value (less than 90 degrees from the preferred direction) and the component of that light in the preferred direction is detected. It is noted that the light passes through each of the storage units and the rotator twice.

Importantly, whether the transmission or reflection mode of operation is employed, compatible digital light deflectors provide three positions of light for each bit location. This requirement is met, for example, simply by associating what are normally three adjacent bit location accessing codes in the stages of a digital light deflector with a single bit location of the storage unit in accordance with this invention.

Having briefly described an encompassing optical memory compatible with the illustrative storage unit in accordance with this invention, we are sufficiently oriented to appreciate fully some practical considerations which dictate, inter alia, power levels and dimensions for the storage unit.

First, in optical memories, the storage unit lies in the focal plane of the optical system and, for most efficient arrangements, light strikes the storage unit along the perpendicular to that unit. Specifically, for maximum rotation of the plane of polarization, light travels parallel to the magnetization. Thus, the easy direction of magnetization is preferably in a direction perpendicular to the plane of the storage unit. Partially compensated magnetic materials such as thin films of rare earth iron garnets, for example, gadolinium iron garnet and yttrium aluminum garnet, provide the desired direction for the easy axis. Suitable switching fields exceed the anisotropy field. Operation is at a temperature different from the compensation temperatures of such materials as is the case in accordance with the aforementioned Chang et al. patent. Any demagnetizing fields otherwise present during operation are reduced by the overlay permitting high magnetizations at relatively low currents.

Second, the switching field is light responsive. If the power of the incident light beam is represented as P, then $$P=nh\nu \qquad (1)$$

where $n$ is the number of photons per second, $h$ is Planck's constant and $\nu$ is the frequency of the light ($h\nu$ is the energy value of each photon). Assuming a wavelength of one micron, the energy of a photon is $6.6\times10^{-34}\times3\times10^{14}$ or approximately $2\times10^{-19}$ joules. Thus, for a power level of one milliwatt, $n=5\times10^{15}$. Assuming complete collection, that is, no recombination or trapping, and unit quantum efficiency from $$i=nq \qquad (2)$$

where $i$ is the current and $q$ is the charge per charge carrier, we find $i=5\times10^{15}\times1.6\times10^{-19}=.8$ ma./milliwatt. Note: at one micron, 1 milliwatt≅1 milliampere. The magnetic field H generated at a distance $r$ from one of the portions of the conductive loop may be represented as $$2\pi rH\cong i \qquad (3)$$

If 0.001 inch line widths are taken as being practical and a switching field of $H=5$ oersteds, then fewer than 100 milliamperes (about 20 ma./oersted) are required.

The effective current gain in a photoconductor is given by the ratio of the lifetime $\tau$ of an electron in the conduction band to the transit time $T_r$ between electrodes. From $$T_r=\frac{\text{distance}}{\text{velocity}}=\frac{S}{\mu E}=\frac{S^2}{\mu V}$$

or, more conveniently, $$\frac{1}{T_r}=\frac{\mu V}{S^2} \qquad (4)$$

where $\mu$ is the mobility of charge carriers in the photoconductor, E is the electric field, V is the applied voltage, and S is the electrode separation (that is, distance across the photoconductor). For a one microsecond response, the lifetime $\tau$ is taken to be of the order of $10^{-7}$ seconds. Assuming 0.001 inch dimensions again, we have $$S^2 \cong 6.25 \times 10^{-6} \text{ cm.}^2$$

Typical values for $\mu$ are of the order of 500 cm.$^2$/volt-sec. Accordingly, from Equation 4

$$\frac{1}{T_r} = \frac{500V}{6.25 \times 10^{-6}} \cong 10^8 V;\ T_r = \frac{10^{-8}}{V}$$

and current gain $$\frac{\tau}{T_r} = \frac{10^{-7}V}{10^{-8}} = 10V$$

Third, a suitable adequate-life optical maser, for example the yttrium-aluminum-garnet (YAG or YAlG) maser, provides about one watt of output power. Assume for the moment that only 100 milliwatts of power are used. Loss through the digital light deflector is taken, illustratively, at ten decibels. Consequently, ten milliwatts are available at the photoconductor. A current gain of ten (100 ma.) provides a five oersted field. One volt between conductors P and N provides the required gain. At this voltage, the photoconductive material experiences a rise in temperature of a few tens of degrees centigrade during a one microsecond switching period.

It need only be remembered that both the retentive (and low reluctance materials) are transparent if the transmission mode of operation is employed. Conveniently, to this end the garnets serve also as suitable low reluctance materials. Suitable retentive and/or low reluctance materials such as yttrium-aluminum-garnet having thicknesses of about one to three mils, however, reflect light having wavelengths in the infrared range ($\lambda = 1.06\mu$ for example where $\mu = 10^4$ angstrom units). Accordingly, materials of such thicknesses may be preferred as overlays for operation in the reflection mode.

Writing into a storage unit, in accordance with this invention, is on a random access basis in the manner described regardless of the previous content of the storage unit. All that is required is that the light responsive current flowing through the selected portion of a conductor loop generate a field in excess of the switching threshold of the retentive magnetic material there. Accordingly, a simple electrically-changeable storage unit compatible with a light deflection system is provided. In addition, the (light) power requirements for storage units in accordance with this invention are sufficiently low to permit word organization of an encompassing optical memory. Specifically, if a word-organized memory requires, for example, 40 storage units accessed in parallel, each unit receives one-fortieth of the light. Such power requirements are easily met by existing (YAG) optical masers which have outputs, for example, of one watt.

A storage unit in accordance with this invention may be made, conveniently, by well known evaporation and photo-resist techniques. Specifically, a garnet layer about one mil thick is deposited, conveniently by reactive sputtering techniques, onto a transparent substrate (for example, glass) of arbitrary thickness. Then, a layer of copper about 0.5 mil thick is deposited on the garnet and selectively etched to provide copper conductors about one mil wide. Thereafter, photoconductive material, illustratively cadmium selenide, is deposited through a mask to a thickness of about one-half mil and about one mil wide. Finally, an overlay of garnet one mil thick is deposited.

What has been described is considered to be only illustrative of the principles of this invention. Accordingly, various and numerous other arrangements may be devised by one skilled in the art without departing from the spirit and scope of this invention.

What is claimed is:

1. In combination, a film of magnetic material having first and second stable states, first and second conductors overlying said film in spaced apart positions, means providing low and relatively high potentials to said first and second conductors respectively, a plurality of conductive loops connecting said first and second conductors, each of said loops coupling a portion of said film and providing alternative current paths between said conductors, each of said conductive loops including first and second open circuits therein, and means for selectively closing said first and second open circuits in response to an optical signal for selectively storing said first and second stable states in the coupled portions of said film.

2. A combination in accordance with claim 1 wherein said magnetic material has an easy axis orthogonal to the plase of said magnetic material.

3. A combination in accordance with claim 2 wherein said means for selectively closing said first and second open circuits comprises photoconductive material.

4. A combination in accordance with claim 3 wherein said conductive loops are circular in shape.

5. A combination in accordance with claim 3 including a relatively low reluctance layer overlying said conductive loops.

6. A combination in accordance with claim 5 wherein said magnetic and low reluctance materials are transparent.

7. A combination in accordance with claim 3 including a magnetically retentive material overlying said conductive loops.

8. A combination in accordance with claim 7 wherein said magnetic material is transparent and said retentive material overlying said conductive loops reflects light incident thereto.

9. A combination in accordance with claim 7 wherein said magnetic and retentive materials are transparent.

10. A combination in accordance with claim 5 wherein said magnetic material is transparent and said low reluctance material overlying said conductive loops reflects light incident thereto.

References Cited

UNITED STATES PATENTS

| | | | |
|---|---|---|---|
| 3,145,368 | 8/1964 | Hoover | 340—173 |
| 3,150,356 | 9/1964 | Newman | 340—174 |
| 3,155,944 | 11/1964 | Oberg et al. | 340—174 |
| 3,228,015 | 1/1966 | Miyata et al. | 340—174.1 |
| 3,319,235 | 5/1967 | Chang et al. | 340—174 |

STANLEY M. URYNOWICZ, JR., *Primary Examiner.*